United States Patent [19]
Daste et al.

[11] Patent Number: 4,651,243
[45] Date of Patent: Mar. 17, 1987

[54] SUSPENSION FOR MAGNETIC TRANSDUCER

[75] Inventors: John J. Daste, Northridge; Otto R. Butsch, Thousand Oaks, both of Calif.

[73] Assignee: Magnetic Information Technology, Inc., Chatsworth, Calif.

[21] Appl. No.: 604,872

[22] Filed: Apr. 27, 1984

[51] Int. Cl.⁴ ............................ G11B 5/48; G11B 5/11
[52] U.S. Cl. ...................................... 360/104; 360/128
[58] Field of Search ................................ 360/103–104, 360/102, 105, 107, 109

[56] References Cited
U.S. PATENT DOCUMENTS
3,593,326  7/1971  Turner ................................. 360/103

Primary Examiner—A. J. Heinz
Attorney, Agent, or Firm—Evanns & Walsh

[57] ABSTRACT

A suspension member for a magnetic head and for use in a floppy disc drive mechanism and for supporting the head for contact with the surface of a disk. The suspension member has in it a group of openings in the form of Archimedes spirals. The suspension member is constructed to have the characteristic of having stability in that any deviation out of its plane is along a central axis normal to the surface of the member; a predetermined loading force producing a predetermined deflection. Associated with the member is a magnetic shield secured to the suspension member for shielding the magnetic head.

11 Claims, 4 Drawing Figures

SUSPENSION FOR MAGNETIC TRANSDUCER

BACKGROUND OF THE INVENTION

1. Field of the Invention

The field of the invention is that of floppy disk drives and, particularly, mountings for magnetic transducer heads that contact opposite sides of the disk.

2. Description of the Prior Art

It has become common to record data on both sides of the floppy disk which is mounted in the floppy disk drive unit. In systems of this type, magnetic transducers are provided which come into engagement with opposite sides of the disk. The transducers on opposite sides of the disk, of course, embody the magnetic gaps and the mounting or suspension of the transducers is, of course, critical. Various prior art patents have dealt with the problem of mounting the transducer member. Examples of prior art patents include U.S. Pat. Nos. 3,975,770; 4,089,029; and 4,151,573.

Among known mountings or suspension devices for the magnetic transducer is the type of suspension which takes the form of a gymbal spring which allows certain degrees of movement of the magnetic transducer in relation to the surface of the floppy disk.

With respect to the suspension devices as known in the prior art, they have been subject to certain deficiencies or, on the other hand, lacking in certain desired capabilities that are present in the herein invention, as will be made apparent presently.

Some of the drawbacks present in the prior art included that the assembly of the suspension means or member and the magnetic head were subject to sticking and friction as well as abrasion with respect to the floppy disk.

Other of the suspension devices were inherently unstable in a lateral sense. Prior art devices in general did not embody the capability or charactertistic of being close coupled. In assemblies which embodied a rigid lower magnetic head, such suspension devices would deviate from vertical, that is they were not rectilinear. Prior art devices were subject to inaccuracies stemming from mechanical standing waves generated by other components of the floppy disc drive.

SUMMARY OF THE INVENTION

As indicated in the foregoing, in the herein invention, the assembly includes a transducer mounted in a fixed position which is below the floppy disk, the transducer preferably being mounted in a head having a convex upper surface, one part of which surface is a ramp when the disk is inserted into the drive unit. There may, of course, be a transducer mounted both below and above the floppy disk.

The assembly includes a pivotally mounted load arm in a position above the lower transducer which is fixedly mounted, the upper arm carrying a second magnetic transducer which contacts the upper surface of the floppy disk. The improvements of the invention include the mounting or suspension of the magnetic transducer itself. The mounting or suspension means takes the form of a relatively thin member which may preferably be circular. This member is configured by way of arcuate openings in it which are Archimedes spirals.

Both the magnetic transducer, which is in a position below the disk, and the one above the disk are suspended by the same type of mounting. The suspension or mounting member has particular individual characteristics which are provided to produce improved results. The assembly constitutes a dual compliant device. The suspension member has a plurality of arcuate openings in it, the end parts of the openings overlapping each other so as to leave arcuate material between the ends of the openings. The openings are in the form of Archimedes spirals. The suspension device provides the characteristic that the center point at the axis can deviate and the deviation will be precisely along the central axis of the device and the member can be designed so that an accurate predetermined force is necessary to produce deviation of the suspension member. The nature of the suspension member is such that it can be designed and constructed to have a predetermined mechanical resonance which is a high frequency as compared to other devices which typically had low frequencies which were subject to inaccuracies stemming from mechanical standing waves generated by other components of the floppy disk drive. Thus, the frequency is relatively high compared to other devices, as referred to.

In light of the foregoing, the primary object of the invention is to provide an improved suspension member for a magnetic head which is a dual-compliant device particularly adapted for employment in a floppy disk drive wherein magnetic transducers contact both sides of the disk.

A further object is to make available a magnetic suspension member for magnetic transducer heads having arcuate openings in it in the form of an Archimedes spiral and the member having particular characteristics with respect to deviation of the member and the natural frequency of it.

A further object is to realize a suspension member or device as in the foregoing which overcomes the deficiencies of sticking, friction and abrasion with respect to the floppy disk which were characteristic of prior art devices.

A further object is to realize a suspension device as described having improved stability, particularly in a lateral sense.

A further object is to realize a device as set forth in the foregoing which is closely coupled with respect to the disk. Particularly, an object is to realize and achieve the characteristic that the device, that is, the movable part of the device, will not deviate from vertical.

A further object is to realize a device as referred to which has a natural high frequency as compared to other known devices which had low frequencies and which were subject to inaccuracies stemming from mechanical standing waves generated by other components of the floppy disk drive.

A further object is to realize an assembly including a mounting or suspension member as described in combination with shielding material or a shield mounted closely to, and directly around or over, the transducer head. Such a shield shields against stray electromagnetic waves and is made from a suitable alloy material.

Another object is to realize an assembly wherein the shield as referred to totally encompasses the back of the transducer head.

A further object of the invention is to realize a mounting or suspension means that is adapted to, and is capable of, being mounted in any configuration of a disk drive assembly. These are the purpose realized of achieving a suspension means that can be mounted in any configuration whether it is one that utilizes a button for mounting the magnetic head or whether it is of other construction, the suspension means being of such nature that it can be mounted in any carriage.

BRIEF DESCRIPTION OF A PREFERRED FORM OF THE INVENTION AND MODE OF OPERATION

Figure 1:
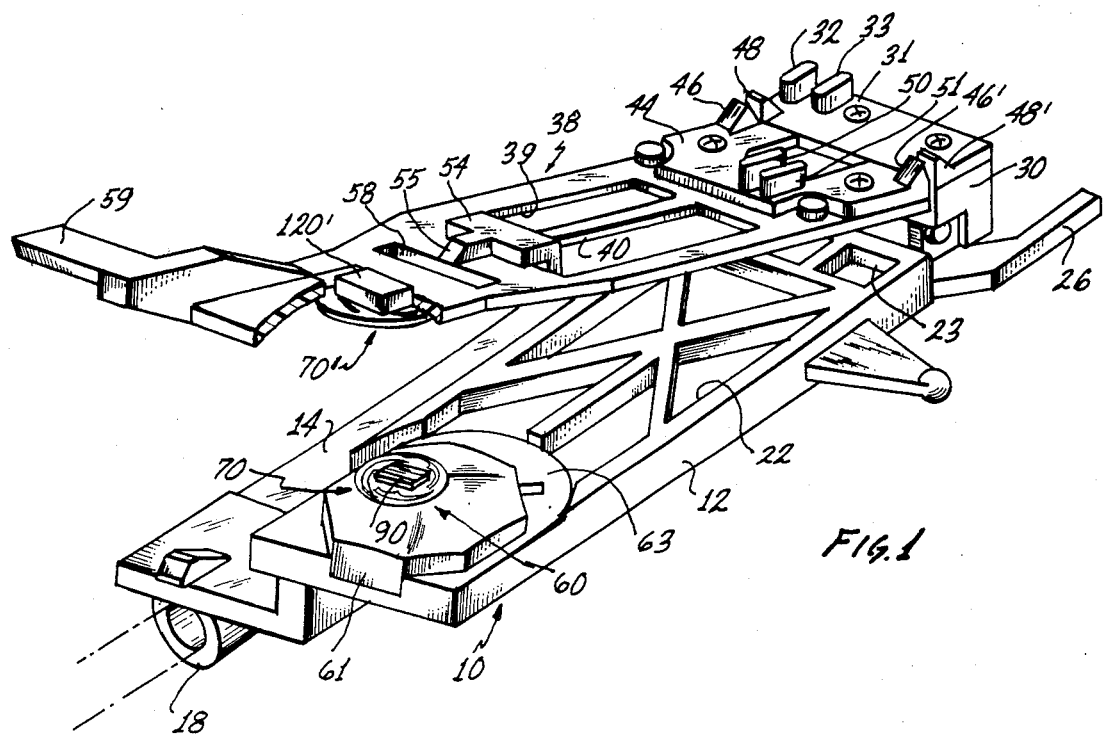
FIG. 1 is an isometric view of the carriage of a floppy disk drive mechanism including a pivoted supporting arm for the upper magnetic head, one magnetic head being on each side of the floppy disk.

FIG. 1 of the drawings is a partial isometric view of parts of a floppy disk drive mechanism in which the invention may be embodied. With respect to the general background of this type of mechanism, reference may be had to prior art patents referred to above, such as U.S. Pat. Nos. 3,879,757; 4,089,029; and 4,151,373.

In FIG. 1 of the drawings, numeral 10 designates the carriage of a floppy disk drive, the carriage being in the form of a frame as shown. The carriage has a main part identified by the numeral 12 and a side part designated by the numeral 14 which is at a lower level, this construction or configuration being as it is in order to facilitate mounting or packaging of the drive in its environment. At one end of the part 14 there is seen the end of a bushing 18, there being a similar bushing at the opposite end of the carriage, these bushings being for the purpose of accommodating mounting the carriage on a rod for reciprocating movement under control of a stepper motor as known in the art.

The frame 10 is constructed of suitable material so as to be of light construction having an interior opening 22 with brace members or strengthening members within the opening as shown. There are additional openings such as indicated at 23. At the rear end of the frame 12 is an extending side arm or finger, as designated at 26, the purpose of which is to engage or operate an optical switch which controls the stepper motor, these parts not being shown.

Numeral 28 designates an outrigger arm having a ball at the end. The ball moves between flat springs, not shown, which maintains the carriage oriented angularly as it is reciprocated.

The rear end, that is, the right end, of the carriage is built up to a higher level by way of the structure as shown at 30, on top of which there is mounted a plate 31 by Philips head screws. At the left end of this plate are a pair of projecting members 32 and 33 having a slot or a way between them to accommodate wires extended through them.

Numeral 38 designates the pivoted load arm which is pivoted at the right end that is pivotally attached to the carriage by way of a leaf spring (not shown) which allows the arm 38 to pivot in a manner to bring the upper transducer head towards and away from the floppy disk, as will be described presently. The load arm 38 is constructed of suitable material and is of light construction having openings in it as designated at 39 and 40. At the rear end of the load arm there is a plate 44 attached to it by Philips head screws, as shown. This plate carries a pair of triangular stop members 46 and 46' which can cooperate with another pair of triangular stop members 48 and 48' mounted on the plate 31. The pairs of triangular stop members can cooperate with each other to limit the angular movement of the load arm 38. On the plate 44 are a pair of projections 50 and 51 which are spaced apart and which provide a space for control wires to pass through.

At the forward end of the openings 39 and 40 in the load arm 38 in a T-shaped pad member 54 having a slanted front end as shown at 55. The purpose of this member is to serve as an adapter to have control wires pass over it to be secured thereto by being glued, these wires passing through a transverse slot 58 in the load arm 38.

At the end of the load arm 38 there is an extending arm identified by the numeral 59 which is for the purpose of lifting the load arm to move the upper transducer away from the floppy disk. In a preferred construction, the arm 59 can be manually operated by way of a crank mechanism and a cam or lifter which lifts this arm.

The carriage 10 carries the lower magnetic transducer which is mounted in the button 60 which itself may be of conventional construction. At the forward end of the button is a rectangular member 61 which is attached to the frame part 12 by being glued and which serves to orient the position of the magnetic head in the button 60 so that it is in a 90° position with respect to the carriage 10. The button 60 and the magnetic transducer, and the suspension member for the transducer, will be described in detail presently.

Numeral 70 designates the suspension member that is carried by the button 60 and which suspends or mounts the magnetic head 90, as will be referred to presently.

The load arm 38 carries the upper magnetic head which is mounted or suspended by a suspension member 70' which is like the suspension member 70. See FIG. 4. The suspension member 70' is circular, and its edges are mounted in a counterbore formed in the underside of the arm 38, the edges being glued thereto. Numeral 120' designates a shield for shielding against stray electromagnetic waves, the shield being carried by the suspension member 70' so as to float with it, being glued thereto.

It will be understood that the invention resides primarily in the supporting or suspension member for the magnetic head which engages the magnetic recording medium. The magnetic recording medium in the exemplary form of the invention referred to is a floppy disk which records on both sides of the floppy disk which rotates within a jacket, that is, reading and writing can take place with respect to each side of the disk. Since the invention is in the support or suspension for the magnetic head which engages the recording medium, only parts of the complete assembly are shown. Such parts as are not shown can be seen in various prior art patents, such as the ones referred to.

Figure 3:
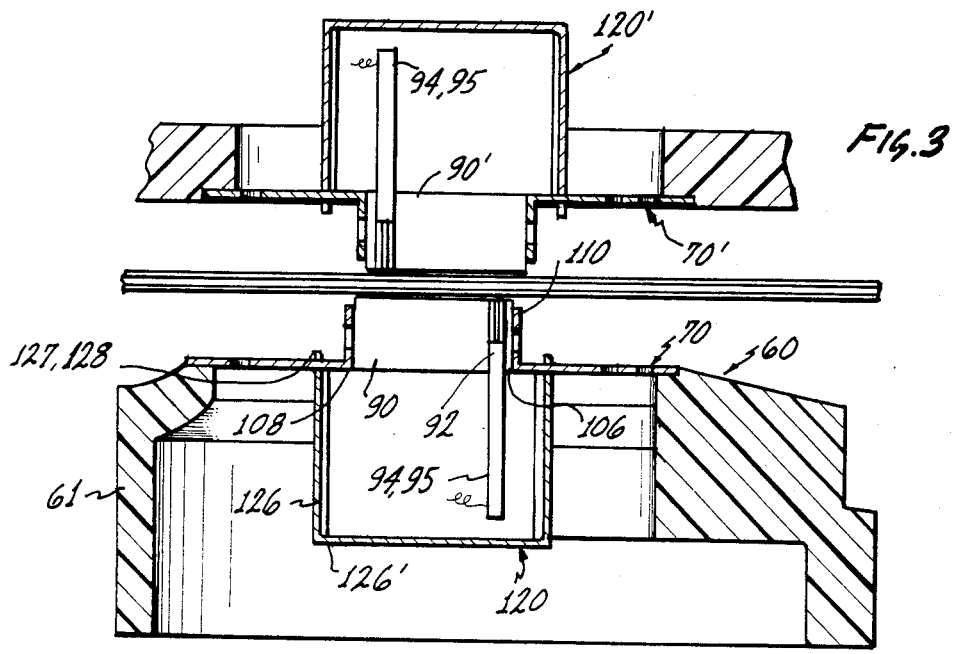
FIG. 3 is a sectional view taken along the line 3—3 of FIG. 2.

The lower magnetic head assembly is in the form of a button, as designated at 60 in FIG. 3, being mounted on the top of frame 12 on surface 63. The suspension means for the magnetic heads that engage the upper and lower sides of the disk are alike. The button 60 is made of insulating material, and it has a partial bore 62 of limited depth, and it has another bore 64 which extends all the way through the button, this bore being off center from the partial bore 62, although the bore 64 can be placed with its center at the central axis of the button 60. At the upper part of the bore 64 there is a shallow counterbore 66 which receives the edges of the supporting or suspension member 70 for the transducer that contacts the recording medium, that is, the floppy disk. The numeral 70 designates the suspension or supporting member for the lower magnetic head. The one for the upper head is designated at 70' and will be referred to again presently. The edges of the suspension member 70 fit into the counterbore 66 in the head 60, as may be seen in FIG. 3. The edges of the suspension member 70' fit into a counterbore in the lower side of load arm 38, as previously described.

The upper suspension member 70 is the one that is illustrated in the isometric view, FIG. 1. The suspension member 70' is shown as a disk formed of a relatively thin material. The flexure assemblies, that is, the top and bottom ones, are alike but are displaced from each other so that the magnetic heads and cores are offset as shown in FIG. 3 to prevent interaction between magnetic fields.

Figure 2:
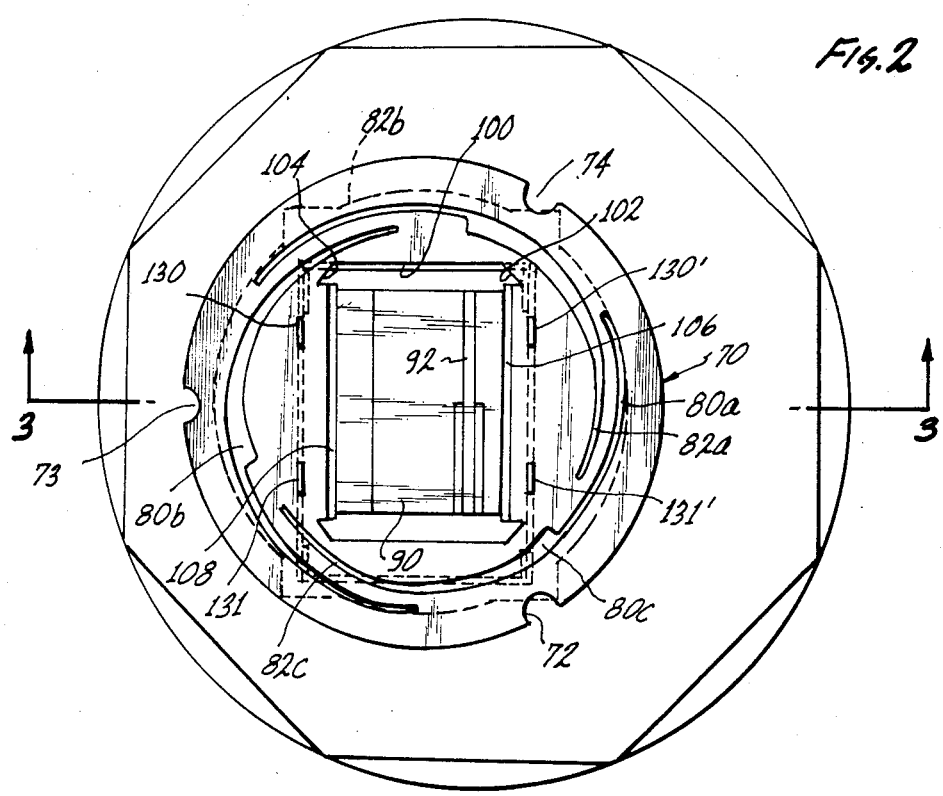
FIG. 2 is a sectional view taken along the line 2—2 of FIG. 1.
Figure 4:
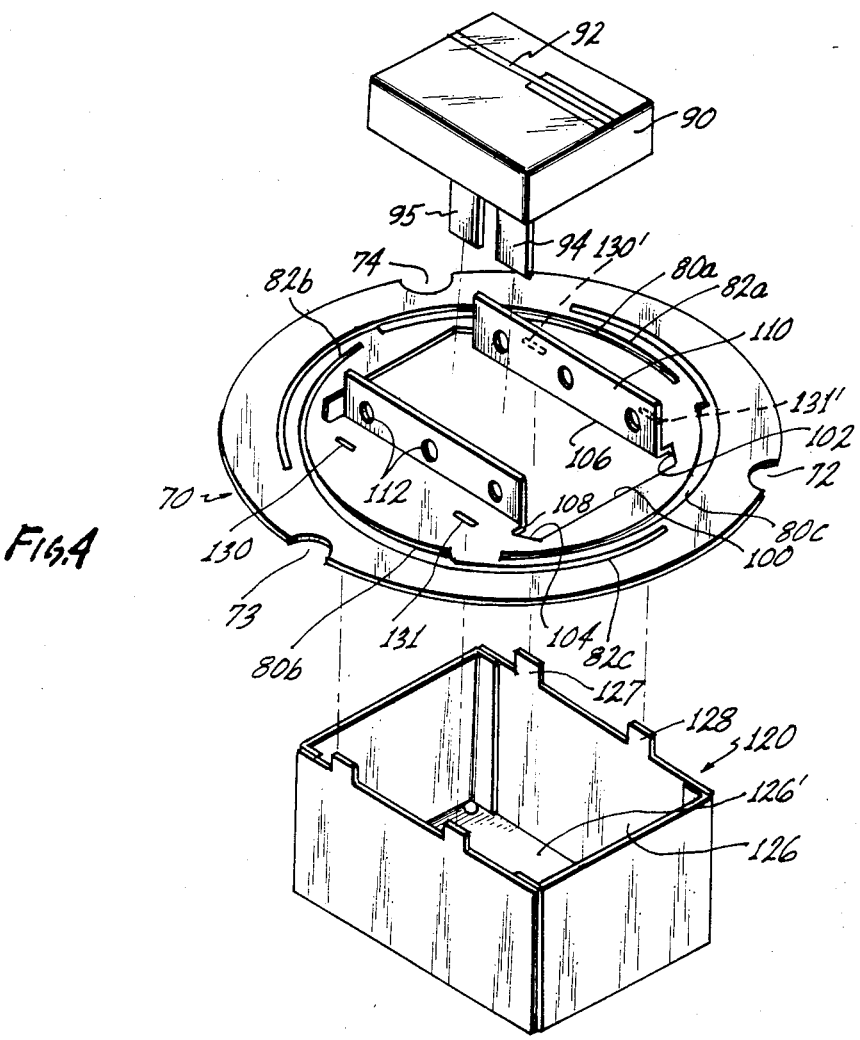
FIG. 4 is an exploded view showing the upper part of the assembly of FIG. 3, that is, the upper magnetic head and its suspension means and the magnetic shield.

As pointed out, the suspension member as shown at 70 in the exemplary form, FIGS. 2 and 4, is disk-shaped and may be constructed of a suitable metal material. See FIG. 4. On the outside periphery are cutouts 72, 73 and 74 equiangularly spaced from each other. Fastening means which may be glue is used at these positions to secure the member 70 to the button. the disk itself, although shown as being round, may have other shapes. The member has arcuate openings in it of a type constituting Archimedes spirals.

An Archimedes spiral is a well-known type of curve which typically is one that beginning from a center, increases in radius as it proceeds outwardly, or stating it the other way, decreases in radius as it proceeds inwardly. Types of devices have been known in the prior art wherein a number of typical Archimedes spirals or portions of spirals formed by slots or openings in a piece of metal have been utilized. It has been discovered that this type of device is particularly adaptable as the suspension member for a magnetic head, as described herein. The suspension member, as illustrated in FIGS. 2 and 4, is a preferred form of device employing Archimedes spirals. In the exemplary form shown, there are three Archimedes spirals which are arcuate openings of limited angular extent, as designated at 80a, 80b and 80c. These openings are alike with their ends overlapping for a number of degrees as shown. Between the overlapping ends are arcuate portions of material as designated at 82a, 82b and 82c. The device could take forms other than the exemplary one wherein the arcuate openings in themetal are in the form of Archimedes spirals.

It is characteristic of the support member that it is rectilinear, meaning that in response to deflecting force against the metal of the member, the center will deflect rectilinearly, that is, directly along an axis normal to the center of the plane of the material.

The significance of the type supporting member as described in the herein invention where it is used as the suspension member for a magnetic head is as follows. The specifications or criteria with respect to movement of the head typically may be that they call for a precise amount of linear movement of the center of the supporting member, that is, the head with this deflection being in response to a predetermined precise loading force. The supporting device as described embodying the Archimedes spirals can readily be designed to meet whatever set criteria or specifications may be established with respect to deflection of the member and loading force. That is, in other words, the supporting member can be readily constructed to provide for a predetermined loading force acting through a predetermined amount of deflection which is the deflection of the center of the supporting member.

As may be seen, the magnetic head, as designated by the numeral 90, is in a position as may be seen in FIG. 3. The magnetic core is designated at 92 with upstanding connector members 94 and 95, there of course being a gap in the magnetic core.

Formed in the intermediate portion of the suspension member 70 on the inside of the arcuate openings, that is, the Archimedes spirals, is a cutout, as designated at 100. The ends of the cutout 100 are slightly widened, as may be seen at 102 and 104. The sides of the cutout 100 are designated at 106 and 108, and extending upwardly, that is, bent upwardly, from these sides are flanges, as designated at 110 and 112, each of these flanges having three holes in it. The magnetic head 90 fits into the cutout 100 in between the flanges 106 and 108 and may be secured therein by way of epoxy extended through the openings in the flanges. The connector members 94 and 95 extend downwardly, as may be seen in FIG. 3.

Numeral 120 designates the lower shielding member which can be constructed of a known shielding material, such as alloys normally used for purposes of shielding. Preferably, the shield is formed initially as a flat piece with the four sides formed as flaps integral with the flat sheet which are then folded normally to the central portion of the flat sheet to form the sides of a box-like shield, as illustrated in the figures. The two opposite sides, as designated at 126 and 126', each have a downwardly extending pair of lugs, as designated at 127 and 128, for the side 126. The suspension member 70 has openings to receive the projections or tabs, such as shown at 127 and 128, these openings being designated at 130, 131, 130' and 131'.

It can be seen that the shields 120 and 120' are in positions close to their respective magnetic heads in order to fulfill their purpose of shielding the heads from electromagnetic radiation.

From the foregoing, those skilled in the art will recognize that the invention as disclosed realizes all of the purposes and objectives as set forth in the foregoing.

The foregoing disclosure is representative of a preferred form of the invention and is to be interpreted in an illustrative rather than a limiting sense, the invention to be accorded the full scope of the claims appended hereto.

What is claimed is:

1. As an article of manufacture, a transducer suspension device for purposes of maintaining at least one magnetic transducer in operative relationship with at least one side of a planar magnetic recording medium, a magnetic transducer assembly including a magnetic head having a magnetic core and gap, and means composed solely of a support member for supporting the said transducer in position to have a transducing relationship with the magnetic recording medium, said supporting member having arcuate openings in it and having portions spaced from each other, the said openings forming Archimedes spirals in said member, said member being constructed to provide for displacement of a center portion of the said member which carries the transducer, the said member having the characteristic that the said center portion, when displaced, is rectilinear and moves precisely along the normal center axis of the member.

2. An article as in claim 1 wherein the said member is constructed whereby the said spirals provide for predetermined axial force along the axis of the member in order to displace it from an initial position.

3. An article as in claim 2 wherein the said spirals in said support member are constructed whereby to provide for a predetermined amount of rectilinear displacement along the axis of the member by said predetermined axial force.

4. An article as in claim 1 including a magnetic shield positioned over the said transducer member, the said transducer member and the magnetic shield having interengaging portions for holding the magnetic shield in position.

5. An article as in claim 1 wherein the said member has an intermediate opening, the said spirals are positioned outside of said opening, the said opening being rectilinear, the said opening having side portions including flanges, the said transducer being positioned between the flanges and secured thereto.

6. An article as in claim 5 including a shield member positioned over the said magnetic head, the said shield and the said support member having interengaging parts holding them together.

7. An article as in claim 1 including a carriage and a support arm for said transducer assembly adapted for moving the magnetic head along a radius of a magnetic recording medium and supporting said magnetic head in a position in contact with the recording medium.

8. An article as in claim 7 including a second arm having a pivoted mounting carrying a second similar head and support means in a position to engage the opposite side of the said recording medium with the second recording head opposite the first.

9. An article as in claim 1 including a carriage and a support arm for the said transducer assembly, the said assembly including a button carried by the support arm, said button having a conformation constructed to receive the said support member, the said support member being secured thereto.

10. An article as in claim 1 including a carriage and a pivoted support arm for a transducer assembly, the support arm having a conformation constructed to directly receive the said support member, and the said support member being secured thereto.

11. An article as in claim 1 wherein said member has a natural resonance determined by the said spirals in the member.

* * * * *